United States Patent
Rao et al.

(10) Patent No.: US 11,846,700 B2
(45) Date of Patent: Dec. 19, 2023

(54) ON-FIELD PHASE CALIBRATION

(71) Applicant: TEXAS INSTRUMENTS INCORPORATED, Dallas, TX (US)

(72) Inventors: Sandeep Rao, Bangalore (IN); Karthik Subburaj, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 176 days.

(21) Appl. No.: 17/132,857

(22) Filed: Dec. 23, 2020

(65) Prior Publication Data

US 2022/0196824 A1  Jun. 23, 2022

(30) Foreign Application Priority Data

Oct. 1, 2020 (IN) .............................. 202041042792

(51) Int. Cl.
*G01S 13/58* (2006.01)
*G01S 7/40* (2006.01)

(52) U.S. Cl.
CPC .............. *G01S 13/584* (2013.01); *G01S 7/40* (2013.01)

(58) Field of Classification Search
CPC .......... G01S 7/356; G01S 7/40; G01S 7/4008; G01S 7/4056; G01S 13/584; G01S 13/343; G01S 13/345
USPC .................................. 342/107, 196, 192, 165
See application file for complete search history.

(56) References Cited

U.S. PATENT DOCUMENTS

| | | | | |
|---|---|---|---|---|
| 4,546,354 A | * | 10/1985 | Boles | G01S 13/66 342/25 C |
| 4,546,355 A | * | 10/1985 | Boles | G01S 13/66 342/25 C |
| 4,549,184 A | * | 10/1985 | Boles | G01S 13/9029 342/107 |
| 4,563,686 A | * | 1/1986 | Boles | G01S 13/90 342/25 C |
| 4,723,124 A | * | 2/1988 | Boles | G01S 13/9023 342/25 C |
| 6,833,808 B2 | * | 12/2004 | Rees | G01S 13/5244 342/162 |

(Continued)

OTHER PUBLICATIONS

International Search Report and Written Opinion for International Patent Application No. PCT/US 2021/053077, dated Dec. 16, 2021, 7 pages.

*Primary Examiner* — Vladimir Magloire
*Assistant Examiner* — Michael W Justice
(74) *Attorney, Agent, or Firm* — Michael T. Gabrik; Frank D. Cimino (57) ABSTRACT

A radar system is provided and includes a radar transceiver integrated circuit (IC) and a processor coupled to the radar transceiver IC. The radar transceiver IC includes a chirp generator configured to generate a plurality of chirp signals and a phase shifter configured to induce a signal phase shift. The radar transceiver IC is configured to transmit a frame of chirps based on the plurality of chirp signals and generate a plurality of digital signals, each digital signal corresponding to a respective reflection received based on the plurality of chirp signals. The processor is configured to control the phase shifter to induce the signal phase shift in a first subset of chirp signals of the plurality of chirp signals and determine a phase shift induced in the first subset of chirp signals by the phase shifter based on the digital signal.

20 Claims, 8 Drawing Sheets

(56) References Cited

U.S. PATENT DOCUMENTS

| | | | |
|---|---|---|---|
| 7,315,225 B2* | 1/2008 | Borysenko | H01P 1/185 333/139 |
| 7,474,262 B2* | 1/2009 | Alland | H01Q 21/0006 342/101 |
| 8,169,362 B2* | 5/2012 | Cook | G01S 13/534 342/162 |
| 8,207,887 B2* | 6/2012 | Goldman | G01S 13/9029 342/159 |
| 8,823,583 B2* | 9/2014 | Hasch | G01S 7/4008 342/194 |
| 9,274,219 B2* | 3/2016 | Lamb | G01S 13/904 |
| 9,400,325 B2* | 7/2016 | Millar | G01S 7/42 |
| 10,305,611 B1* | 5/2019 | Rimini | G01S 13/343 |
| 10,416,292 B2* | 9/2019 | de Mersseman | G01S 17/04 |
| 10,481,696 B2* | 11/2019 | Molchanov | B60R 11/04 |
| 10,495,727 B2* | 12/2019 | Gunn | G01S 7/021 |
| 10,816,655 B2* | 10/2020 | Bharadwaj | G01S 7/4004 |
| 10,955,528 B2* | 3/2021 | Zanati | H01Q 3/38 |
| 11,016,171 B2* | 5/2021 | Melzer | G01S 13/931 |
| 11,125,869 B2* | 9/2021 | Santra | G01S 13/582 |
| 11,163,055 B2* | 11/2021 | Schroder | H04B 7/0413 |
| 11,366,199 B2* | 6/2022 | Lang | G01S 7/4056 |
| 11,428,775 B2* | 8/2022 | Melzer | G01S 7/023 |
| 11,448,745 B2* | 9/2022 | Takeuchi | G01S 13/42 |
| 2004/0046689 A1* | 3/2004 | Rees | G01S 13/5244 342/162 |
| 2006/0109066 A1* | 5/2006 | Borysenko | H01P 1/185 333/164 |
| 2007/0001897 A1* | 1/2007 | Alland | G01S 7/352 342/158 |
| 2010/0321234 A1* | 12/2010 | Goldman | G01S 13/9029 342/25 A |
| 2011/0006944 A1* | 1/2011 | Goldman | G01S 13/9054 342/25 A |
| 2011/0025546 A1* | 2/2011 | Cook | G01S 7/2923 342/162 |
| 2012/0242538 A1* | 9/2012 | Hasch | G01S 7/4008 342/194 |
| 2013/0009807 A1* | 1/2013 | Lamb | G01S 13/904 342/25 B |
| 2016/0146925 A1* | 5/2016 | Millar | G01S 13/44 342/113 |
| 2017/0343652 A1* | 11/2017 | de Mersseman | G01S 7/4861 |
| 2018/0172813 A1* | 6/2018 | Rao | G01S 7/415 |
| 2018/0224524 A1* | 8/2018 | Gunn | G01S 5/06 |
| 2019/0041495 A1 | 2/2019 | Steinbuch et al. | |
| 2019/0146059 A1* | 5/2019 | Zanati | H01Q 3/38 342/173 |
| 2019/0242972 A1* | 8/2019 | Melzer | G01S 13/93 |
| 2019/0305859 A1* | 10/2019 | Rimini | G01S 13/345 |
| 2019/0317207 A1* | 10/2019 | Schroder | G01S 13/325 |
| 2019/0391249 A1* | 12/2019 | Takeuchi | G01S 13/536 |
| 2020/0116850 A1* | 4/2020 | Santra | G01S 13/582 |
| 2020/0132811 A1* | 4/2020 | Goswami | G01S 7/415 |
| 2020/0174098 A1* | 6/2020 | Lang | G01S 7/4056 |
| 2020/0341112 A1* | 10/2020 | Itkin | G01S 13/347 |
| 2020/0358178 A1* | 11/2020 | Nagaishi | G01S 7/4008 |
| 2020/0379085 A1* | 12/2020 | Subburaj | G01S 7/032 |
| 2021/0063534 A1* | 3/2021 | Shams | G01S 7/4052 |
| 2021/0080537 A1* | 3/2021 | Melzer | G01S 13/584 |
| 2022/0003839 A1* | 1/2022 | Heller | G01S 7/406 |
| 2022/0065986 A1* | 3/2022 | Vaucher | G01S 13/584 |
| 2022/0236406 A1* | 7/2022 | Wintermantel | G01S 13/343 |
| 2022/0252721 A1* | 8/2022 | Carroll | G01S 13/931 |

* cited by examiner

ON-FIELD PHASE CALIBRATION

BACKGROUND

Radar systems transmit electromagnetic wave signals that objects in their path then reflect. By capturing the reflected signal, a radar system can evaluate the detected object(s).

Beamforming is a signal processing technique used with sensor arrays for directional signal transmission or reception. Spatial selectivity is achieved by using adaptive or fixed receive/transmit beam patterns. Doppler division multiple access ("DDMA") is a signal processing technique also used with sensor arrays for identification of unique transmit array elements in the receive path.

Electronics devices employing beamforming or DDMA techniques include transmission ("TX") phase-shifters. These phase shifters have device dependent non-linearity resulting in a non-linear mapping between the desired programmed phase and the actual programmed phase. To overcome such non-linearity, calibration of the phase shifters can be performed at the factory during manufacturing of the electronic device incorporating the phase shifters. Factory calibration, however, may be insufficient to capture the effects of temperature/aging during the life of the device.

Alternatively, using internal loopback procedures, a test signal generated in a transmit channel and provided to the receive channels via an internal loopback path may be used to determine phase response of each transmit channel. The phase response can be used to adjust the transmit signal to calibrate the phase shift for any offset. However, such on-chip loopback calibration may be undesirable to calibrate phase shifts due to onboard routing mismatches.

SUMMARY

In one aspect, a radar system includes a radar transceiver integrated circuit (IC) and a processor coupled to the radar transceiver IC. The radar transceiver IC includes a chirp generator configured to generate a plurality of chirp signals and a phase shifter configured to induce a signal phase shift. The radar transceiver IC is configured to transmit a frame of chirps based on the plurality of chirp signals and generate a plurality of digital signals, each digital signal corresponding to a respective reflection received based on the plurality of chirp signals. The processor is configured to control the phase shifter to induce the signal phase shift in a first subset of chirp signals of the plurality of chirp signals and determine a phase shift induced in the first subset of chirp signals by the phase shifter based on the digital signal.

In another aspect, a method includes generating a plurality of chirp signals, inducing a signal phase shift in a first subset of chirp signals of the plurality of chirp signals, and initiating transmission of a frame of chirps based on the plurality of chirp signals. The method also includes generating a plurality of digital signals in response to receiving reflected chirps of the plurality of chirp signals of the frame of chirps and determining a phase shift induced in the first subset of chirp signals by the phase shifter based on the digital signal.

DETAILED DESCRIPTION

Figure 1:
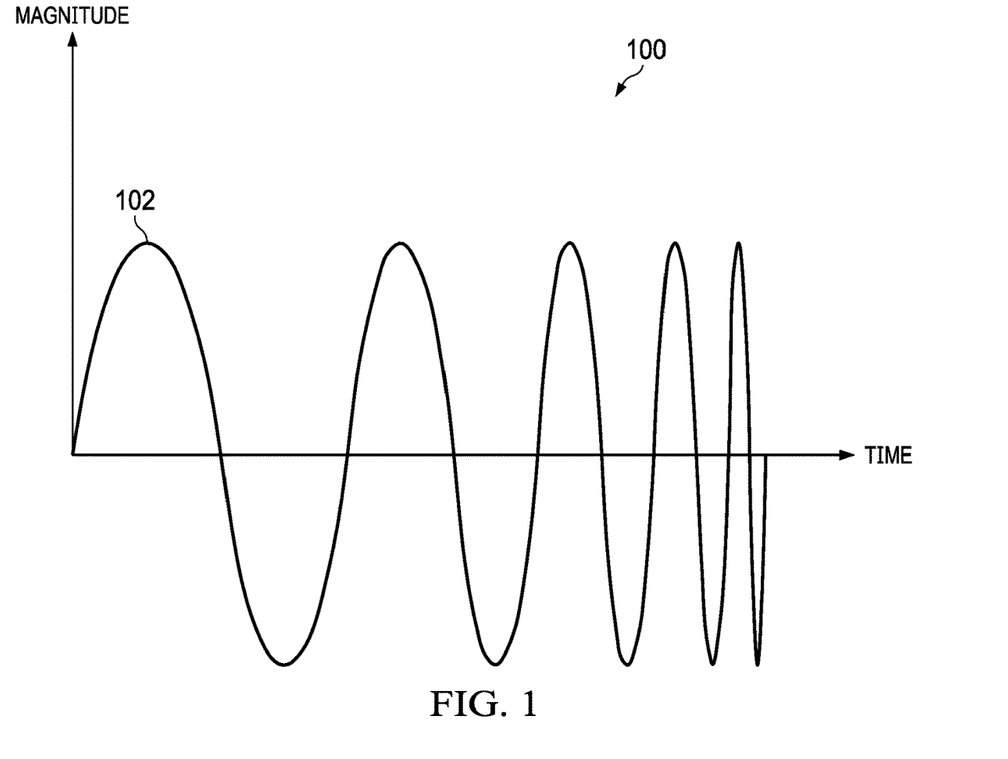
FIG. 1 is a signal diagram of a chirp signal on a magnitude-time plot according to an example.
Figure 2:
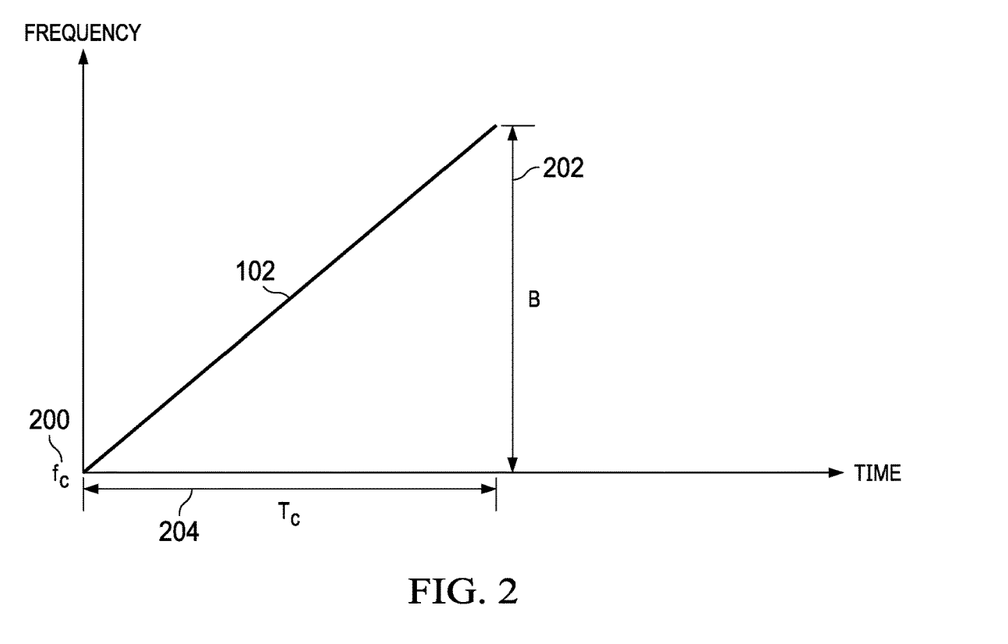
FIG. 2 is a signal diagram of the chirp signal of FIG. 1 on a frequency-time plot according to an example.

Millimeter wave (mmWave) is a special class of radar technology that uses short-wavelength electromagnetic waves. In a class of mmWave technology called frequency-modulated continuous wave (FMCW), FMCW radars transmit a frequency-modulated signal continuously in order to measure range as well as angle and velocity. In radar systems, an electromagnetic signal gets transmitted that objects in its path reflect. In the signal used in FMCW radars, the frequency increases linearly with time. This type of signal is also called a chirp. FIG. 1 illustrates a signal diagram 100 of a representative chirp signal 102 with magnitude (amplitude) as a function of time. FIG. 2 illustrates the chirp signal 102 of FIG. 1 with frequency as a function of time. The chirp signal 102 is characterized by a start frequency ($f_c$) 200, bandwidth (B) 202 and duration ($T_c$) 204. The slope of the chirp signal captures the rate of change of frequency.

Figure 3:
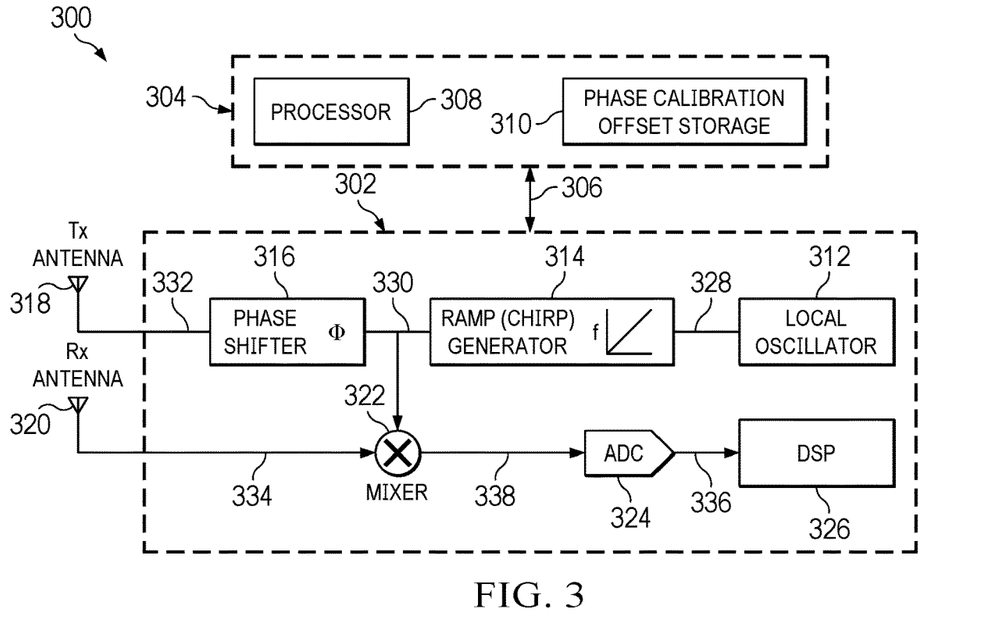
FIG. 3 is a block diagram of an FMCW radar system according to an example.

FIG. 3 illustrates a block diagram of an FMCW radar system 300 configured to transmit a chirp signal such as chirp signal 102 and capture the signals reflected by objects in its path. As shown, radar system 300 includes a radar transceiver integrated circuit (IC) 302 and a processing unit 304. The processing unit 304 is coupled to the radar transceiver IC 302 via a serial interface 306 to send data to and receive data from the radar transceiver IC 302. In one example, the serial interface 306 may be a high-speed serial interface such as a low-voltage differential signaling (LVDS) interface. In another example, the serial interface may be a lower speed serial peripheral interface (SPI).

Transceiver IC 302 includes functionality to generate multiple digital intermediate frequency (IF) signals (alternatively referred to as de-chirped signals, beat signals, or raw radar signals) from reflected chirps. Further, the transceiver IC 302 may include functionality to perform part of the signal processing of radar signals received therein and to provide the results of this signal processing to the processing unit 304 via the serial interface 306. In one example, radar transceiver IC 302 performs a range fast Fourier transform (FFT) for each radar frame. In another example, the radar transceiver IC 302 performs a range FFT and a Doppler FFT for each radar frame.

The processing unit 304 includes functionality to process the data received from the radar transceiver IC 302 to complete any remaining signal processing to determine, for example, distance, velocity, location, and/or angle of any detected objects. The processing unit 304 may also include functionality to perform post processing of the information about the detected objects, such as tracking objects, determining rate and direction of movement, etc. The processing unit 304 may perform phase shifter calibration as per any example of calibration described herein. The processing unit 304 may include any suitable processor or combination of processors (illustrated as processor 308) as needed for the processing throughput of the application using the radar data. For example, the processing unit 304 may include a digital signal processor (DSP), a microcontroller (MCU), an SOC combining both DSP and MCU processing, or a floating point gate array (FPGA) and a DSP. The processing unit 304 also includes a computer-readable storage memory 310 for storing phase calibration data.

Transceiver IC 302 includes a local oscillator 312, a ramp generating component 314, a phase shifter 316, a transmit antenna 318, a receive antenna 320, a mixer 322, an analog-to-digital converter (ADC) 324, and a digital signal processor (DSP) 326. While FIG. 3 illustrates a single representative TX chain and RX chain, multiple chains may be used in some examples to support multiple TX and RX antennas.

Local oscillator 312 is operable to provide reference signals (such as timing and/or reference frequencies) to the ramp generating component 314. In some examples, the local oscillator 312 itself may provide a frequency ramp centered around a lower frequency, which may then be translated to the frequency of transmission by the ramp generating component 314. The ramp generating component 314 is arranged to provide the resulting ramp signals to phase shifter 316 via line 330. Phase shifter 316 may be controlled by the processing unit 304 to apply a phase shift to the generated ramp signals on line 330 if a phase shift is needed such as in beamforming or DDMA radar techniques, for example. Phase shifter 316 may alter the phase of the ramp signal or may allow the ramp signal to pass through unaltered to the transmit antenna 318 via line 332. Based on a prior calibration of the radar system 300, the processing unit 304 may access a phase calibration value (from storage 310 for example) for the particular phase shift value desired so that the phase shifter 316 applies a phase shift that achieves an expected result in the signal transmitted by TX antenna 318, and the transmit antenna 318 is operable to transmit those signals over the air.

In some examples, a series of chirps or a chirped continuous wave (CW) signal is generated at ramp generating component 314 based on the input from local oscillator 312 that is transmitted over the air by transmit antenna 318. The transmitted chirped signal reflects from objects within the range and coverage of the radar beam.

Receive antenna 320 is operable to receive signals over the air and to provide the received signal to mixer 322 on line 334. In turn, the mixer 322 may also receive signals from ramp generating component 314, mix the signals from the receive antenna 320 with the signals from the ramp generating component 314, and send the resulting mixed signals to ADC 324. The ADC 324 is operable to convert analog signals to digital signals. DSP 326 receives signals from ADC 324 via line 336 and is operable to process the digital signals.

In some examples, a transmitted chirped signal from the transmit antenna 318 reflects from objects, and the reflected signals are received at antenna 320 and passed to mixer 322. Mixer 322 mixes the received signal with the transmitted frequency ramp to produce an analog intermediate frequency (IF) signal on line 338. The analog IF signal is sampled by ADC 324 to produce a digital IF signal on line 336. The digital IF signal is then processed and analyzed by DSP 326 to determine velocity and range of objects within the beam.

Figure 4:
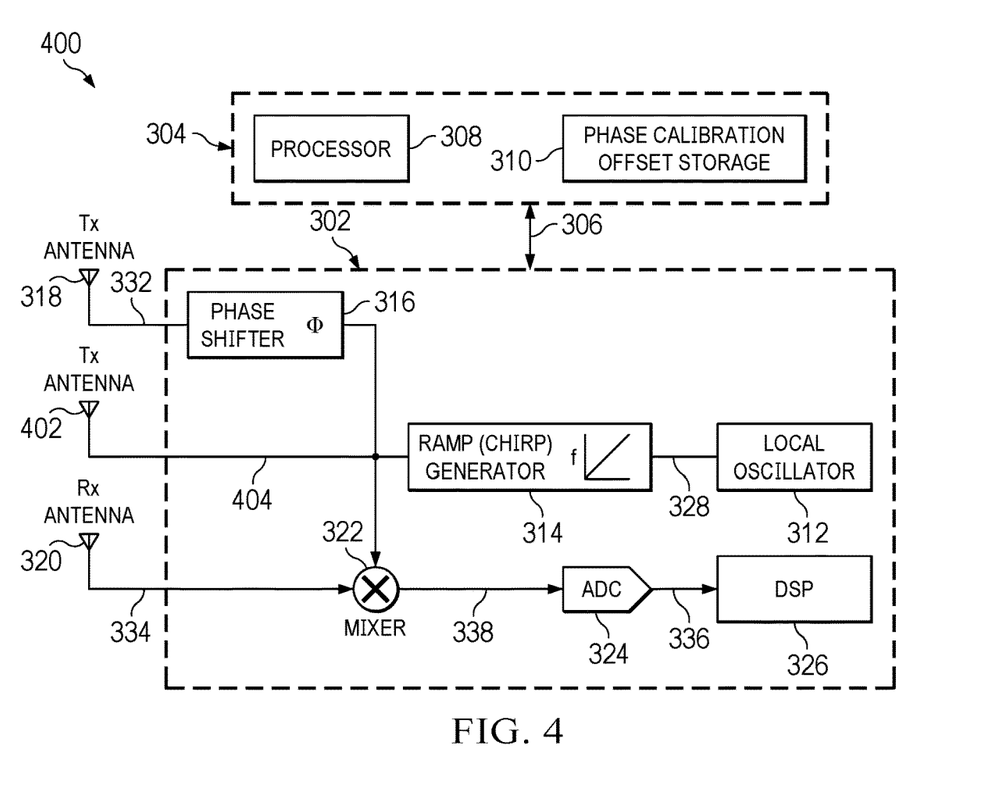
FIG. 4 is a block diagram of an FMCW radar system according to another example.

The radar system 300 of FIG. 3 may be employed, for example, in DDMA radar techniques where the same transmitter can emit signals with and without phase shift. In a beamforming example, FIG. 4 is provided. FIG. 4 includes similar elements discussed above for FIG. 3 and illustrates a radar system 400 having a plurality of transmit paths: one including phase shifter 316, TX antenna 318, and line 332, and another path including an additional TX antenna 402 coupled to the ramp generating component 314 by a line 404 with no phase shifter. Alternatively, a phase shifter (not shown) may be also coupled to TX antenna 402 and not activated or activated to apply a phase shift of zero in a transmission sequence where no phase shift of the transmit signal is to occur. Further, DDMA radar techniques may also be carried out with the radar system 400 of FIG. 4.

Figure 5:
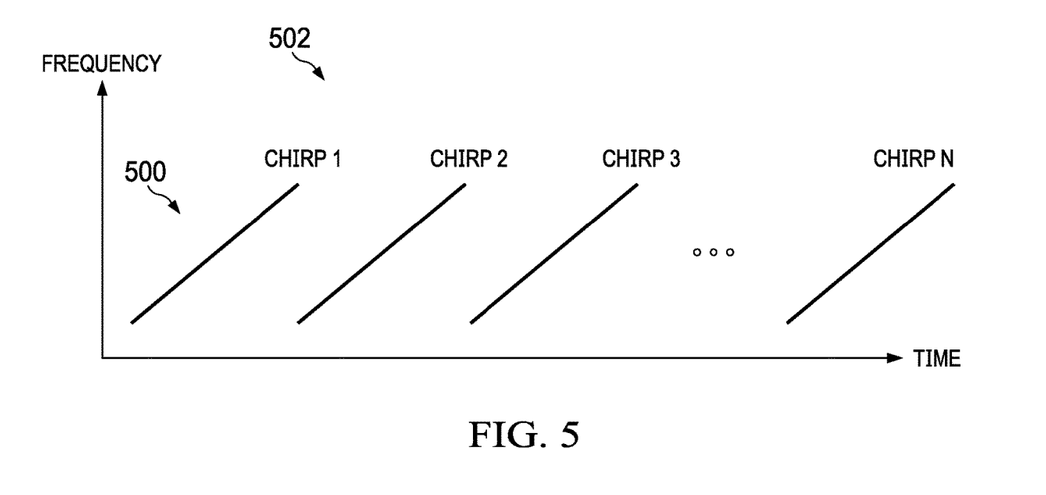
FIG. 5 is an example of a chirp transmission frame according to an example.

Determining the range of objects within the beam includes performing FFT processing on the digitized samples, where the frequency of the peaks in the range FFT directly corresponds to the ranges of various objects in the scene. While the frequency of a peak in the range FFT directly corresponds to the range of the object, the phase of this peak is extremely sensitive to small changes in the range of the object. For example, a change in the object's position by a quarter of a wavelength ($\approx$1 mm at 77 GHz) translates to a complete phase reversal of 180 degrees. This phase sensitivity is the basis of radar's ability to estimate the frequency of a vibrating object. It also forms the basis for velocity estimation. In order to resolve scenes in the velocity dimension, a radar can send out a sequence of chirps 500, equally spaced in time, in a unit called a frame 502 as illustrated in FIG. 5. Each frame 502 can include N chirps that may be equally spaced (as shown) or asymmetrically spaced.

Figure 6:
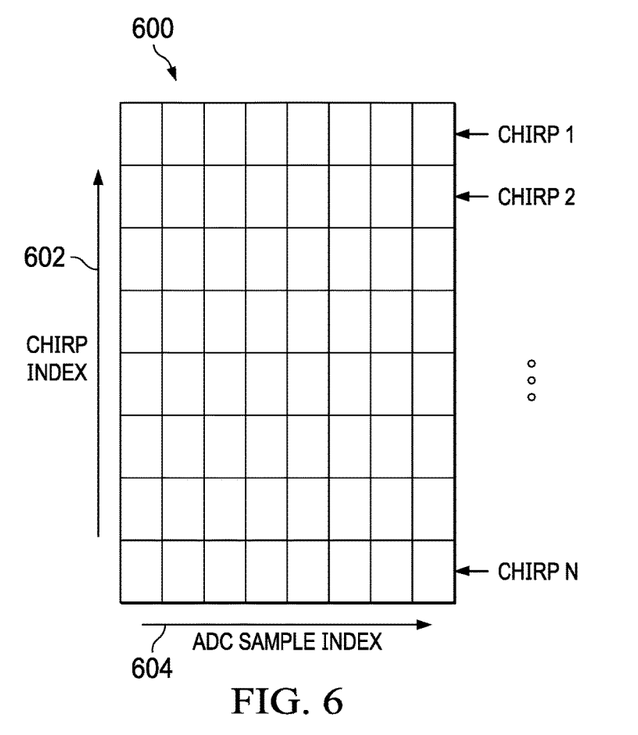
FIG. 6 is an example of a matrix of analog-to-digital samples according to an example.

FIG. 6 illustrates a matrix 600 illustrating ADC samples corresponding to the N chirps in the frame arranged according to chirp index 602 and ADC sample index 604. In a signal-processing chain, a device such as the DSP 326 performs a range FFT on the digitized samples corresponding to each chirp 500, with the output stored as consecutive rows in a matrix. Each row of the matrix 600 contains ADC samples from a respective chirp 500. Successive rows contain the data across chirps 500. A Doppler FFT is then performed across the columns of the matrix 600 to yield a 2D-FFT of the digitized samples corresponding to the frame 502.

Figure 7:
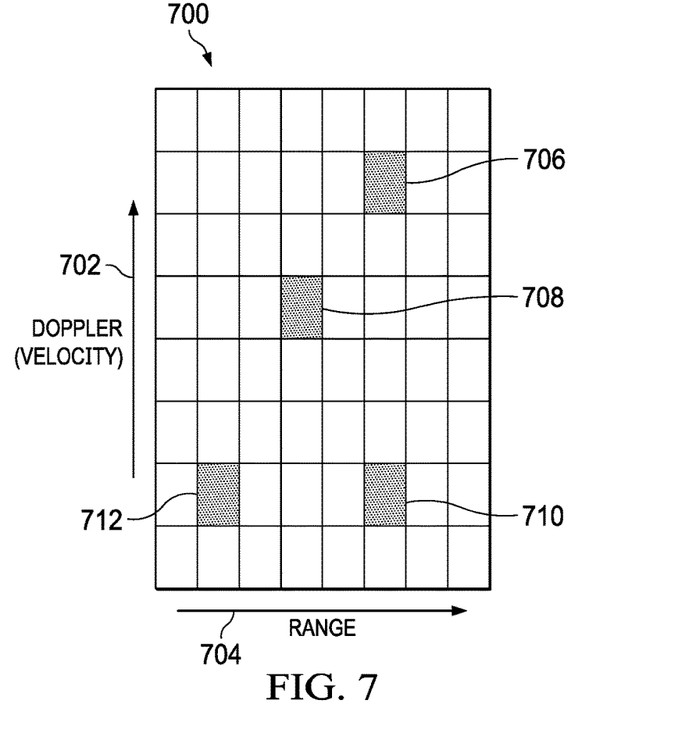
FIG. 7 is an example illustrating a 2D-FFT matrix according to an example.

FIG. 7 illustrates a 2D-FFT matrix 700 arranged according to Doppler index 702 and range index 704 according to an example. Peaks 706, 708, 710, 712 in the 2D-FFT matrix 700 correspond to detected objects. The location of each peak 706, 708, 710, 712 in the 2D-FFT matrix corresponds to the range and Doppler (relative to the radar) of the object. The 2D-FFT matrix 700 can be referred to as a "range-Doppler" matrix. Further, each cell in the 2D-FFT matrix 700 can be referred to as a "range-Doppler" cell.

Figure 8:
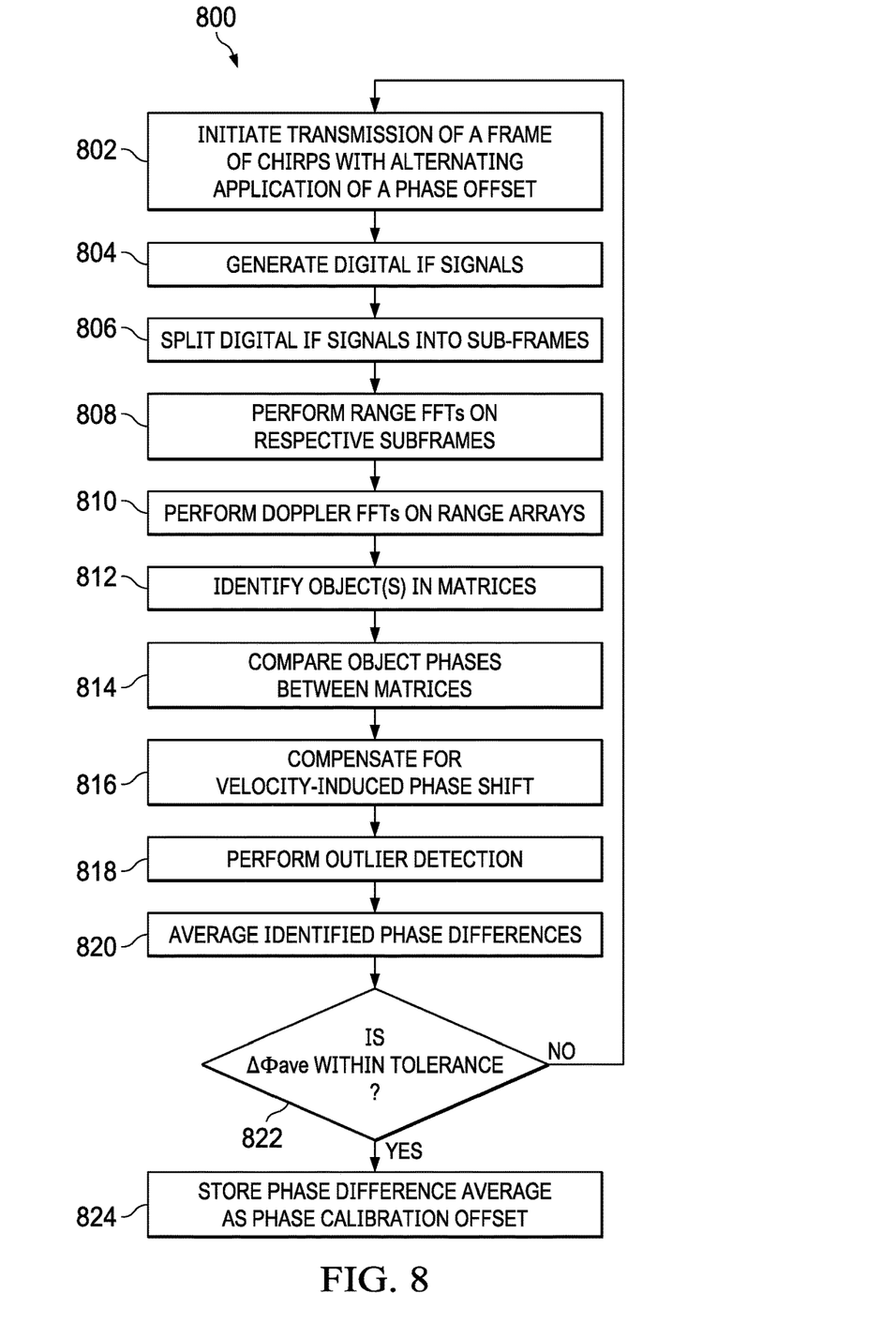
FIG. 8 is a flow diagram of a method for phase shift calibration according to an example.

FIG. 8 illustrates a flow diagram of a phase shifter calibration technique 800 according to an example. A processor (e.g., processing unit 304 of FIGS. 3, 3*b*) may be programmed to control a phase shifter to apply a specific phase shift to a ramp signal to be used in the radar system. In an ideal system, the phase shift realized in the system would match or be substantially equal to the desired phase shift. However, depending on factors such as device characteristics and other non-ideal parameters for a specific phase shifter, the programmed phase may not be the actual phase that gets applied to the signal. Accordingly, the processor may be programmed to look up a calibration value that has been calibrated at the factory for use with a particular phase shifter to modify the programmed phase so that the phase shifter applies the desired phase to the signal. Calibration of the phase shifter is, therefore, a factor in achieving a desired phase signal modification. A phase shifter may change over time, however, so that an earlier calibration value becomes out-of-date. In this case, the phase shifter may drift and begin to apply incorrect phases once again to a signal. As such, the phase shifter may need to be recalibrated. In addition, routing mismatches between multiple transmitter paths may further contribute to differences between the actual phase shift and the phase shift desired to be applied to the signal. Technique 800 provides a method for calibrating the phase shifter whether the radar system in which it is incorporated is calibrated at its manufacturing facility or out in the field.

Figure 9:
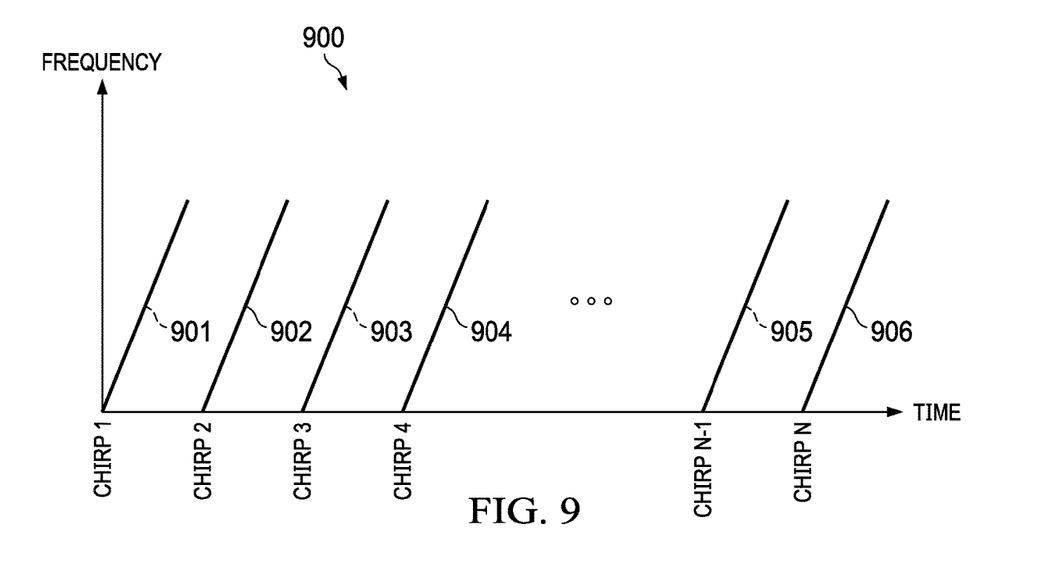
FIG. 9 is an example of a chirp transmission frame according to an example.

Technique 800 begins with initiation 802 of the transmission of a frame of chirps with alternating phase shifts. While a ramp generator such as ramp generating component 314 is controlled to generate a series of similar chirps, a first subset of the series (e.g., every other chirp in the series) is modified with a first phase shift prior to being transmitted by the TX antenna while a second subset of the series (e.g., the chirps in the series not belonging to the first subset) may be unmodified or may be modified with a second phase shift prior to being transmitted. Referring to FIG. 9, an alternating chirp frame 900 is shown according to an example. In the frame of chirps 900, odd-numbered chirps 901, 903, 905 (e.g., first, third, nth-1, etc.) are transmitted without the phase shifter applying a desired or intended phase shift to the ramp signals from the ramp generator. Alternatively, the phase shifter may be controlled to apply a phase shift of zero to the odd-numbered chirps 901, 903, 905 prior to being transmitted. For the even-numbered chirps 902, 904, 906 (e.g., second, fourth, nth, etc.), however, the ramp signals are modified by the phase shifter to induce a desired value ($\Delta\Phi_{setting}$) of phase shift for transmission. In this manner, non-phase-shifted chirps are interleaved with phase-shifted chirps. The desired value ($\Delta\Phi_{setting}$) of phase shift is the value that is to be calibrated. In alternative examples, the odd-numbered chirps 901, 903, 905 may be transmitted with phase-shifted chirps while the even-numbered chirps 902, 904, 906 may be transmitted with no phase shift applied thereto.

Technique 800 may be used to calibrate the phase shifter when the real difference in phase between the transmitted odd- and even-numbered chirps 901-906 does not match the desired phase shift value ($\Delta\Phi_{setting}$). Each desired phase shift value to be used with a particular phase shifter should be calibrated separately because the phase shifter may not exhibit similar effects for each phase. However, interpolation by using a pair of calibrated values to find an uncalibrated value therebetween can be used to approximate the effects of the phase shifter for the uncalibrated value.

Figure 10:
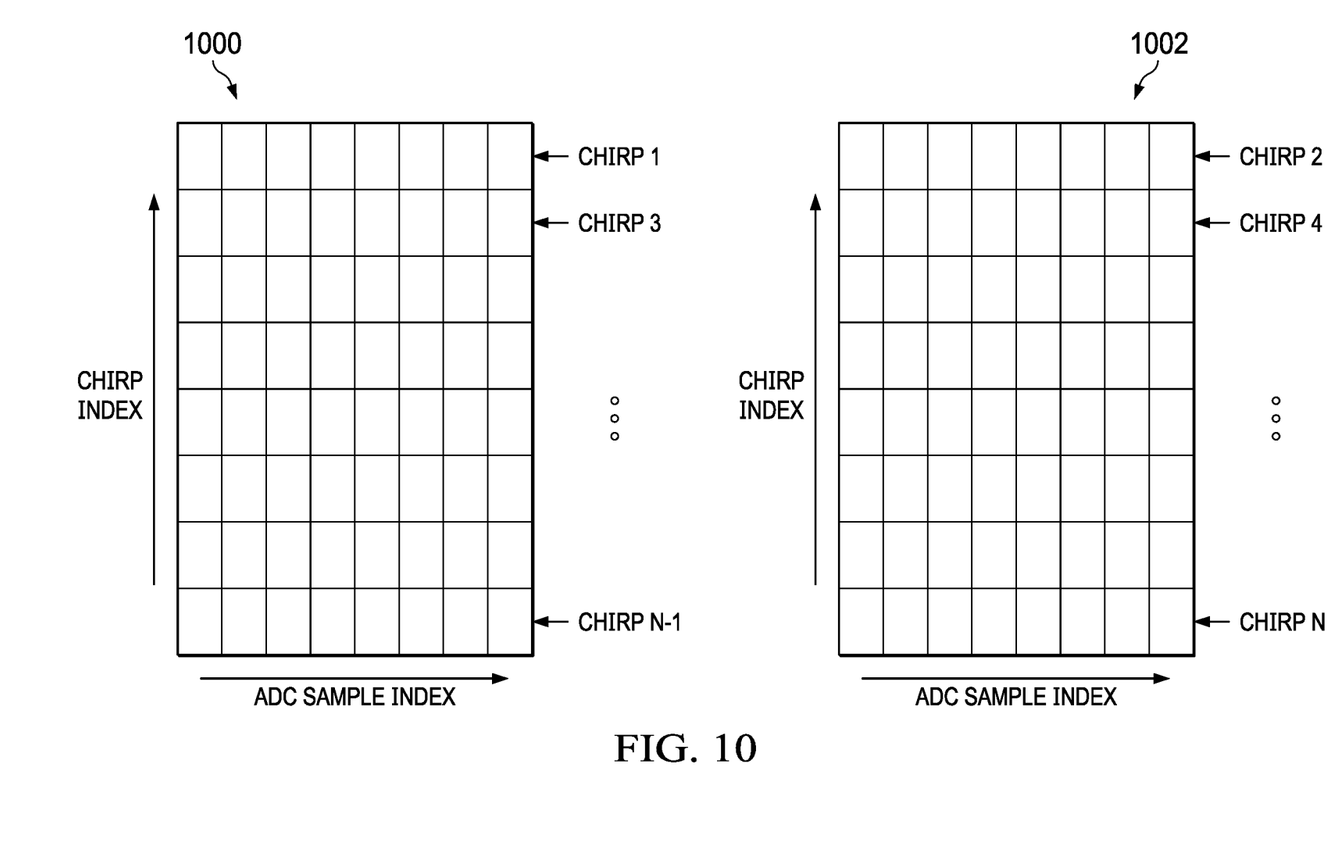
FIG. 10 is an example of matrices of grouping analog-to-digital samples according to an example.

Referring back to FIG. 8, digital IF signals are generated 804 as reflection signals are received from reflected chirps. The digital IF signals are split 806 and grouped together into respective sub-frames based on the signals belonging to the set of received signals from the unshifted chirps (e.g., odd-numbered chirps 901, 903, 905) and the set of received signals from the shifted chirps (e.g, even-numbered chirps 902, 904, 906). FIG. 10 illustrates matrices 1000, 1002 created from separated digital IF signals. Matrix 1000 includes odd-numbered chirps such as chirp 1, chirp 3, . . . , chirp N−1 while matrix 1002 includes even-numbered chirps such as chirp 2, chirp 4, . . . , chirp N.

Figure 11:
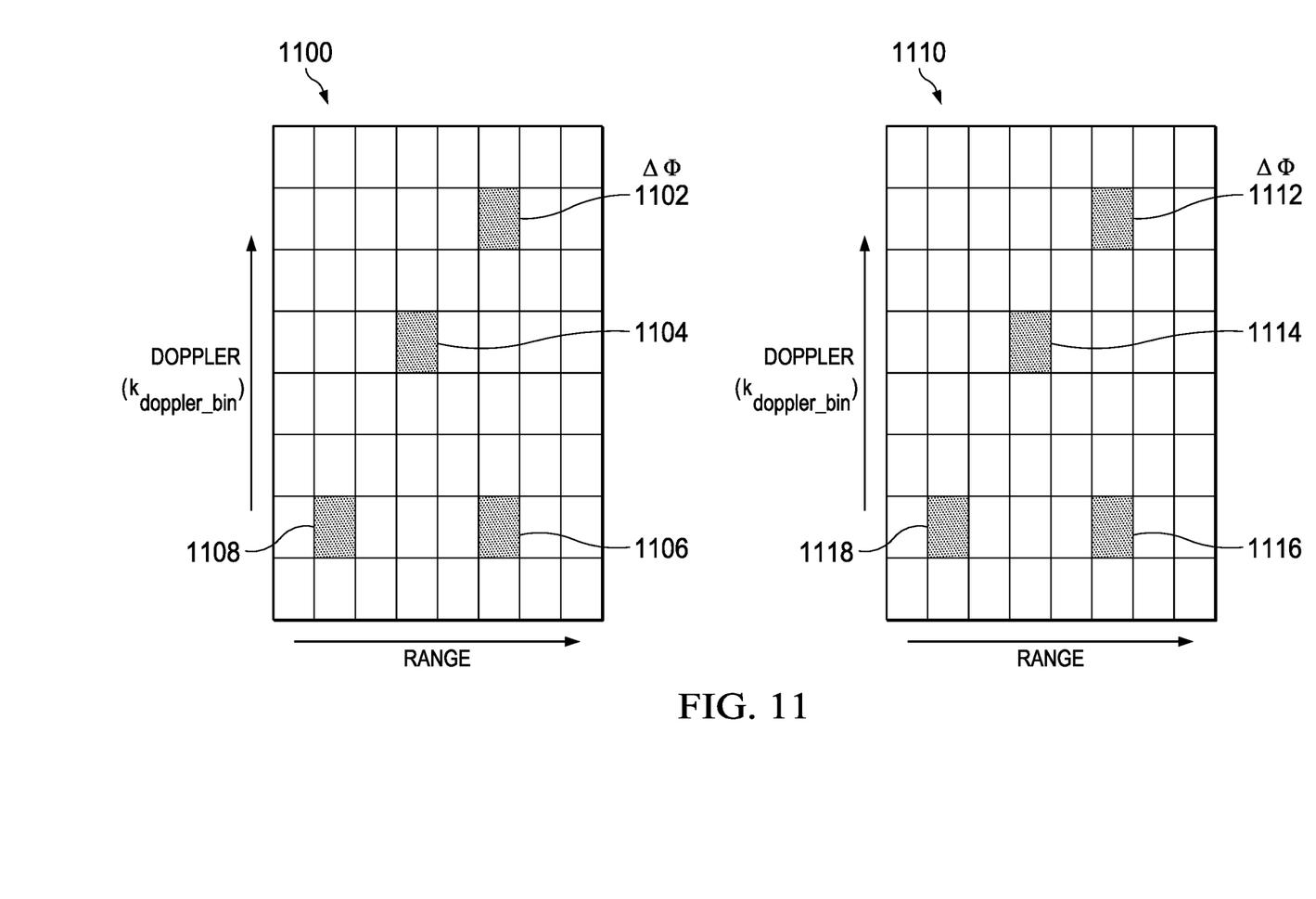
FIG. 11 is an example illustrating 2D-FFT matrices based on the matrices of FIG. 10 according to an example.

Referring back to FIG. 8, range FFTs are performed 808 on the digital IF signals in each matrix 1000, 1002 to generate a range array for each digital IF signal. Doppler FFTs are then performed 810 on each odd- or even-numbered range array to generate a pair of range-Doppler arrays. As illustrated in FIG. 11, an odd-numbered Doppler FFT 1100 with peaks 1102, 1104, 1106, 1108 referenced in various range-Doppler cells is generated based on the odd-numbered chirp matrix 1000, and an even-numbered Doppler FFT 1110 with peaks 1112, 1114, 1116, 1118 referenced in various range-Doppler cells is generated based on the even-numbered matrix 1002.

Referring to FIGS. 8 and 11, a detection algorithm is run to identify 812 detected objects in the 2D-FFT matrices 1100, 1110. Object identification includes converting the complex 2D-FFT matrices 1100, 1110 to real positive numbers by taking the absolute value of the matrix elements. A detection algorithm such as, for example, constant false alarm rate (CFAR) detection, is then run on the resulting matrices to identify peaks 1102, 1112. The peaks 1102, 1112 are subsequently identified as detected objects. In some examples, the sum of the absolute value of the corresponding elements of the 2D-FFT matrices across RX antennas is computed and the resulting matrix is then used for identifying detected objects. It is also possible to sum the absolute values of the corresponding elements of the pair of 2D-FFT matrices (corresponding to the odd and even chirps for a specific RX antenna) and use this for detection.

Once the cells in the 2D-FFT matrices 1100, 1110 corresponding to detected objects have been identified, technique 800 compares 814 corresponding phases of the range-Doppler cells between the two 2D-FFT matrices 1100, 1110. For the $i^{th}$ detected object, let the difference or shift between the phases of the corresponding pair of cells (one from each 2D-FFT 1100, 1110 at a same range index and Doppler index) be $\Delta\Phi_i$. Movement of the object during or between the application of one chirp pulse and the following chirp pulse induces a velocity-induced phase shift independent of the phase shift induced by the phase shifter simply because the object moved between the chirps. For objects in non-zero row Doppler cells, the phase can be corrected 816 to compensate for velocity-induced phase shift. This correction is computed as:

$$\frac{\pi}{N_{doppler}} k_{doppler\_bin}, \quad (1)$$

where $N_{doppler}$ is the length of the Doppler dimension of the 2D-FFT matrix 1100, 1110, and $k_{doppler\_bin}$ is the Doppler index of the range-Doppler cell corresponding to the target. For each $\Delta\Phi_i$, the corrected value is denoted as $\Delta\Phi_{i,corr}$.

Figure 12:
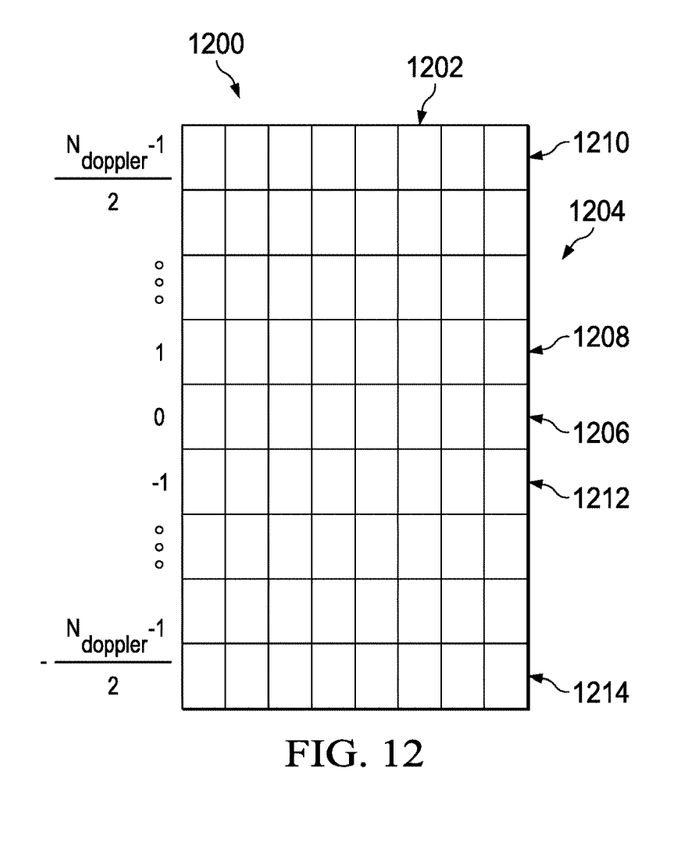
FIG. 12 is an example of an indexing scheme for Doppler indices for a 2D-FFT with an odd number of rows according to an example.

FIG. 12 illustrates an indexing scheme 1200 for the Doppler index ($k_{doppler\_bin}$) for a 2D-FFT 1202 with an odd number of rows 1204. As illustrated, a first row 1206 ($k_{doppler\_bin}=0$) is arranged as the center vertical row. The rows above the zero Doppler row 1206 such as rows 1208 and 1210 correspond to positive Doppler ($k_{doppler\_bin}>0$), while rows such as rows 1212 and 1214 below the zero Doppler row 1206 correspond to negative Doppler ($k_{doppler\_bin} < 0$).

Figure 13:
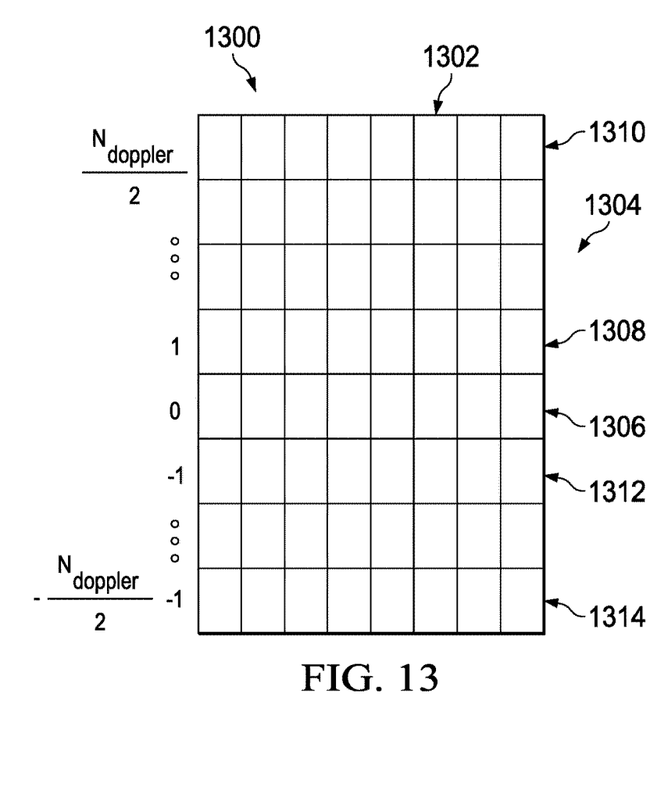
FIG. 13 is an example of an indexing scheme for Doppler indices for a 2D-FFT with an even number of rows according to an example.

FIG. 13 illustrates an indexing scheme 1300 for the Doppler index ($k_{doppler\_bin}$) for a 2D-FFT 1302 with an even number of rows 1304. As illustrated, no row 1304 is a center row because matrix 1302 has an even number of rows 1304. In this case, a first row 1306 corresponding to the top row of the lower half of rows 1304 is arranged as the center vertical row ($k_{doppler\_bin}=0$). The rows above the zero Doppler row 1306 such as rows 1308 and 1310 correspond to positive Doppler ($k_{doppler\_bin}>0$), while rows such as rows 1312 and 1314 below the zero Doppler row 1306 correspond to negative Doppler ($k_{doppler\_bin}<0$).

Referring again to FIG. 8, in some examples, an outlier detection algorithm is performed 818 to detect and remove outliers in the set $\{\Delta\Phi_{1,corr}, \Delta\Phi_{2,corr}, \Delta\Phi_{3,corr} \ldots \}$. For example, outliers may be identified by their signal-to-noise ratio, by an estimation that the outlier value is outside an expected range of values, and the like. The average of all the identified phase differences (with or without outliers removed) is computed 820 as:

$$\Delta\Phi_{ave} = \frac{\Sigma\Delta\Phi_{i,corr}}{N_{objects}}, \quad (2)$$

where as $\Sigma\Delta\Phi_{i,corr}$ is the sum of all corrected values and $N_{objects}$ is the number of corrected values.

The $\Delta\Phi_{ave}$ represents an estimate of the true or real phase shift applied for an intended setting of $\Delta\Phi_{setting}$. If a difference between the $\Delta\Phi_{ave}$ value and the $D_{setting}$ is outside a desired tolerance 822, technique 800 may return to the transmission step at 802 in one example and retry with a modified $\Delta\Phi_{setting}$ value. For example, if the $\Delta\Phi_{ave}$ is determined to insert too much phase shift into the signal, the value for the $\Delta\Phi_{setting}$ may be decreased by the difference in extra phase shift and processed through the steps of technique 800 for another iteration. Repeated iterations of modifying the $\Delta\Phi_{setting}$ value until the $\Delta\Phi_{ave}$ value falls within a desired tolerance may be performed.

Both $\Delta\Phi_{ave}$ and $\Delta\Phi_{setting}$ can be stored 824 in computer-readable memory such as in a look-up table. In this manner, the look-up table is created listing the phase shifter setting $\Delta\Phi_{setting}$ together with its applied phase shift $\Delta\Phi_{ave}$. Technique 800 can be repeated for other values of the $\Delta\Phi_{setting}$. The table need not be exhaustive but can be configured to only contain phase shifts around the vicinity of the phase shifts that are to be applied for a specific application (e.g., implementing a TX multiplexing scheme such as DDMA includes a specific set of phase shifts). Each application, then, looks up the table, identifies the entry with the $\Delta\Phi_{ave}$ closest to its desired setting, and sets the phase shifter to the corresponding $\Delta\Phi_{setting}$ or interpolates the value as described above. If there are multiple RX antennas, then technique 800 can be repeated for the pair of 2D-FFTs generated at each RX antenna, and the phase difference estimated thereof can be included in the average computation.

Technique 800 can be used by radar systems 300 and 400, for example, to calibrate their phase shifter(s) 316 in the field after the systems 300 and 400 leave their manufacturing facility. The technique 800 can be set up to run on a time-based schedule or to be run manually. Furthermore, technique 800 does not require immobility of the radar systems 300 and 400. That is, calibration of the phase shifter(S) 316 of the radar systems 300 and 400 by performing technique 800 can be accomplished while the radar systems 300 and 400 are in motion such as when installed on a moving vehicle, for example. Creating separate 2D-FFTs based on whether received signals correspond with phase-shifted or non-phase-shifted chirp transmissions as described herein is useful to generate 2D-FFTs where peaks detected in each 2D-FFT are correspond to the same range-Doppler cell location. For a stationary field of view, one set of chirps without phase shift being applied may be transmitted followed by transmission of the phase-shifted chirps or vice versa because the field of view does not change between signal transmission types. For a moving field of view (e.g., where the radar system, the objects in the field of view, or both change position relative to each other), however, interleaving the chirp signals can reduce field of view differences between the resulting 2D-FFTs when one type of chirp transmission follows the other type of chirp transmission in time.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A radar system comprising:
   a radar transceiver integrated circuit (IC) comprising:
   a chirp generator configured to generate a plurality of chirp signals; and
   a phase shifter coupled to the chirp generator to receive the plurality of chirp signals and configured to induce a phase shift in one or more of the plurality of chirp signals; and
   a processor coupled to the radar transceiver IC and configured to:
   control the phase shifter to induce a target phase shift in a first subset of chirp signals of the plurality of chirp signals; and
   generate a plurality of digital signals in response to receiving reflected chirps of the plurality of chirp signals;
   process the plurality of digital signals to generate first and second range-Doppler arrays;
   identify one or more objects in the first and second range-Doppler arrays, each of the one or more objects that is identified being represented in corresponding cells of the first and second range-Doppler arrays;
   for each of the one or more objects identified in the first and second range-Doppler arrays, compare the phase of that object represented in the first range-Doppler array to the phase of that object represented in the second range-Doppler array to compensate for a velocity-induced phase shift of that object; and
   determine an actual phase shift in the first subset of chirp signals resulting from the target phase shift induced in the first subset of chirp signals by the phase shifter based on the compare operation.

2. The radar system of claim 1, wherein the processor is further configured to control the phase shifter to not induce a phase shift in each chirp signal of the second subset of chirp signals.

3. The radar system of claim 1, wherein the chirp signals of the first subset of chirp signals are interleaved with the chirp signals of the second subset of chirp signals.

4. The radar system of claim 1, wherein the processor is further configured to:
generate a first matrix based on a first subset of digital signals of the plurality of digital signals, the first subset of digital signals corresponding to one or more reflections received based on the first subset of chirp signals; and
generate a second matrix based on a second subset of digital signals of the plurality of digital signals, the second subset of digital signals corresponding to one or more reflections received based on the second subset of chirp signals.

5. The radar system of claim 4, wherein the processor is further configured to:
perform a range fast Fourier transform (FFT) on each digital signal in the first matrix to generate a first range array for each digital signal in the first matrix;
perform a range FFT on each digital signal in the second matrix to generate a second range array for each digital signal in the second matrix;
perform Doppler FFTs on columns in the first range array to generate the first range-Doppler array; and
perform Doppler FFTs on columns in the second range array to generate the second range-Doppler array.

6. The radar system of claim 5, wherein the processor is further configured to:
identify one or more peaks in each of the first and second range-Doppler arrays, the one or more peaks corresponding to respective range-Doppler cells and corresponding to one or more objects in a field of view of the radar system;
identify one or more phase shifts, each phase shift corresponding to a shift in phase between a respective peak of the one or more peaks in the first range-Doppler array and its corresponding peak in the second range-Doppler array; and
determine the actual phase shift in the first subset of chirp signals based on the identified one or more phase shifts.

7. The radar system of claim 6, wherein the processor is further configured to calculate an average phase shift of the identified one or more phase shifts; and
wherein the processor, in being configured to determine the actual phase shift in the first subset of chirp signals, is configured to determine the actual phase shift in the first subset of chirp signals based on the average phase shift.

8. The radar system of claim 6, wherein the processor is further configured to store the determined actual phase shift in the first subset of chirp signals in a computer-readable storage memory.

9. The radar system of claim 6, wherein the plurality of chirp signals is a first plurality of chirp signals, and the processor is further configured to determine whether a difference between the target phase shift and the determined actual phase shift is within a tolerance value; and
when the difference is not within the tolerance value:
transmit a second frame of chirp signals;
control the phase shifter to induce a modified phase shift in a first subset of chirp signals of the second plurality of chirp signals, the modified phase shift based on the determined actual phase shift in the first subset of chirp signals; and
determine an iteration phase shift resulting from the modified phase shift induced in the first subset of chirp signals of the second plurality of chirp signals by the phase shifter based on digital signals corresponding to reflections received based on the second plurality of chirp signals.

10. The radar system of claim 7, wherein the processor is further configured to remove outliers of the identified one or more phase shifts before calculating the average phase shift.

11. A method comprising:
generating a plurality of chirp signals including a first subset of chirp signals and a second subset of chirp signals;
inducing a target phase shift, by a phase shifter, in the first subset of chirp signals;
initiating transmission of the plurality of chirp signals;
generating a plurality of digital signals in response to receiving reflected chirps of the plurality of chirp signals;
processing the plurality of digital signals to generate first and second range-Doppler arrays;
identifying one or more objects in the first and second range-Doppler arrays, each of the one or more objects that is identified being represented in corresponding cells of the first and second range-Doppler arrays;
for each of the one or more objects identified in the first and second range-Doppler arrays, comparing the phase of that object represented in the first range-Doppler array to the phase of that object represented in the second range-Doppler array to compensate for a velocity-induced phase shift of that object; and
determining an actual phase shift in the first subset of chirp signals resulting from the target phase shift induced in the first subset of chirp signals by the phase shifter based on results of the comparing operation.

12. The method of claim 11, wherein each chirp signal of the second subset of chirp signals is absent an induced phase shift by the phase shifter.

13. The method of claim 12 further comprising interleaving the chirp signals of the first subset of chirp signals with the chirp signals of the second subset of chirp signals.

14. The method of claim 12 wherein the processing further comprises:
generating a first matrix based on a first subset of digital signals of the plurality of digital signals, the first subset of digital signals corresponding to one or more reflections received based on the first subset of chirp signals of the first plurality of chirp signals; and
generating a second matrix based on a second subset of digital signals of the plurality of digital signals, the second subset of digital signals corresponding to one or more reflections received based on the second subset of chirp signals.

15. The method of claim 14, wherein the processing further comprises:
performing range fast Fourier transforms (FFTs) on each digital signal in the first matrix to generate a first range array for each digital signal in the first matrix;
performing range fast Fourier transforms (FFTs) on each digital signal in the second matrix to generate a second range array for each digital signal in the second matrix;
performing Doppler FFTs on columns in the first range array to generate the first range-Doppler array; and
performing Doppler FFTs on columns in the second range array to generate the second range-Doppler array.

16. The method of claim 15, wherein the identifying further comprises:
- identifying one or more peaks in each of the first and second range-Doppler arrays, the one or more peaks corresponding to respective range-Doppler cells and corresponding to the one or more objects in a field of view;
- identifying one or more phase shifts, each phase shift corresponding to a shift in phase between a respective peak of the one or more peaks in the first range-Doppler array and its corresponding peak in the second range-Doppler array; and
- determining the actual phase shift in the first subset of chirp signals of the first plurality of chirp signals based on the identified one or more phase shifts.

17. The method of claim 16, wherein the method further comprises calculating an average phase shift of the identified one or more phase shifts; and
- wherein determining the actual phase shift in the first subset of chirp signals of the first plurality of chirp signals by the phase shifter comprises determining the actual phase shift in the first subset of chirp signals of the first plurality of chirp signals based on the average phase shift.

18. The method of claim 16 further comprising storing the determined actual phase shift in the first subset of chirp signals in a computer-readable storage memory.

19. The method of claim 16, wherein the plurality of chirp signals is a first plurality of chirp signals, and the method further comprises determining whether a difference between the target phase shift and the determined actual phase shift is within a tolerance value; and
- when the difference is not within the tolerance value:
  - transmitting a second plurality of chirp signals;
  - controlling the phase shifter to induce a modified phase shift in a first subset of chirp signals of the second plurality of chirp signals, the modified phase shift based on the determined actual phase shift in the first subset of chirp signals of the first plurality of chirp signals; and
  - determining an iteration phase shift resulting from the modified phase shift induced in the first subset of chirp signals of the second plurality of chirp signals by the phase shifter based on digital signals corresponding to reflections received based on the second plurality of chirp signals.

20. The method of claim 17, further comprising removing outliers of the identified one or more phase shifts before calculating the average phase shift.

* * * * *